June 17, 1924.
G. W. ROLLINS
1,498,299
MACHINE FOR PLACING TIRES UPON WHEEL RIMS
Filed March 12, 1919
4 Sheets-Sheet 1
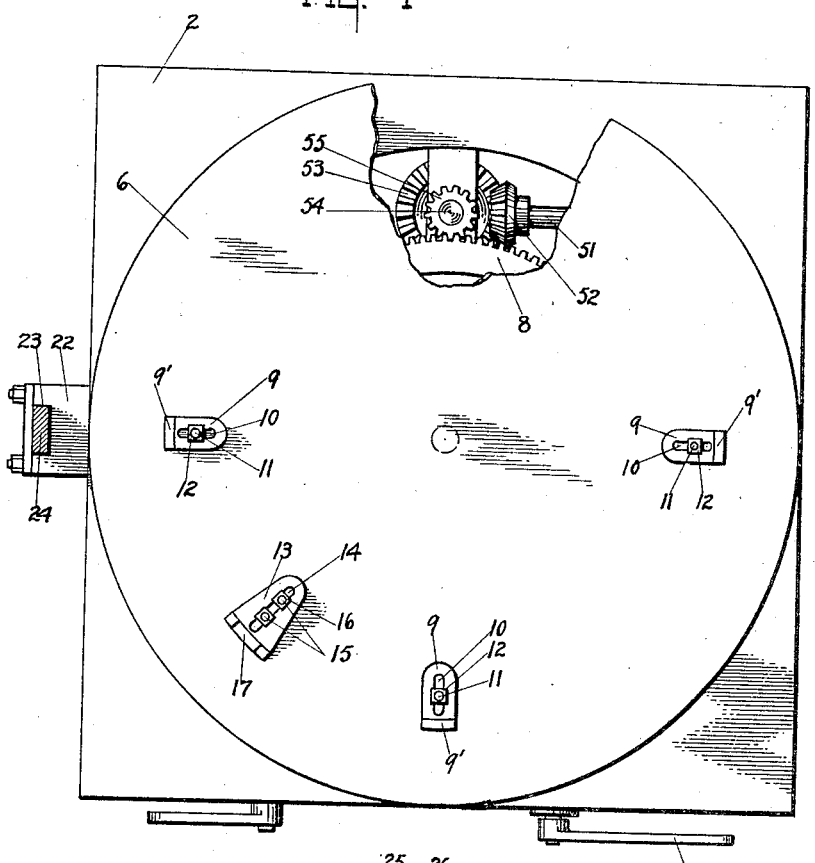
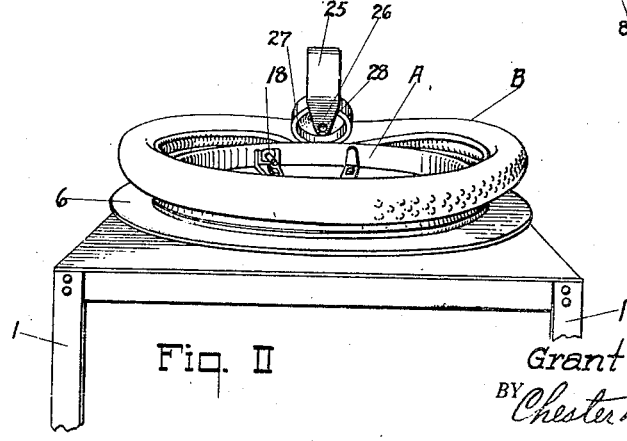
INVENTOR.
Grant W. Rollins.
BY Chester W. Braselton
ATTORNEY.

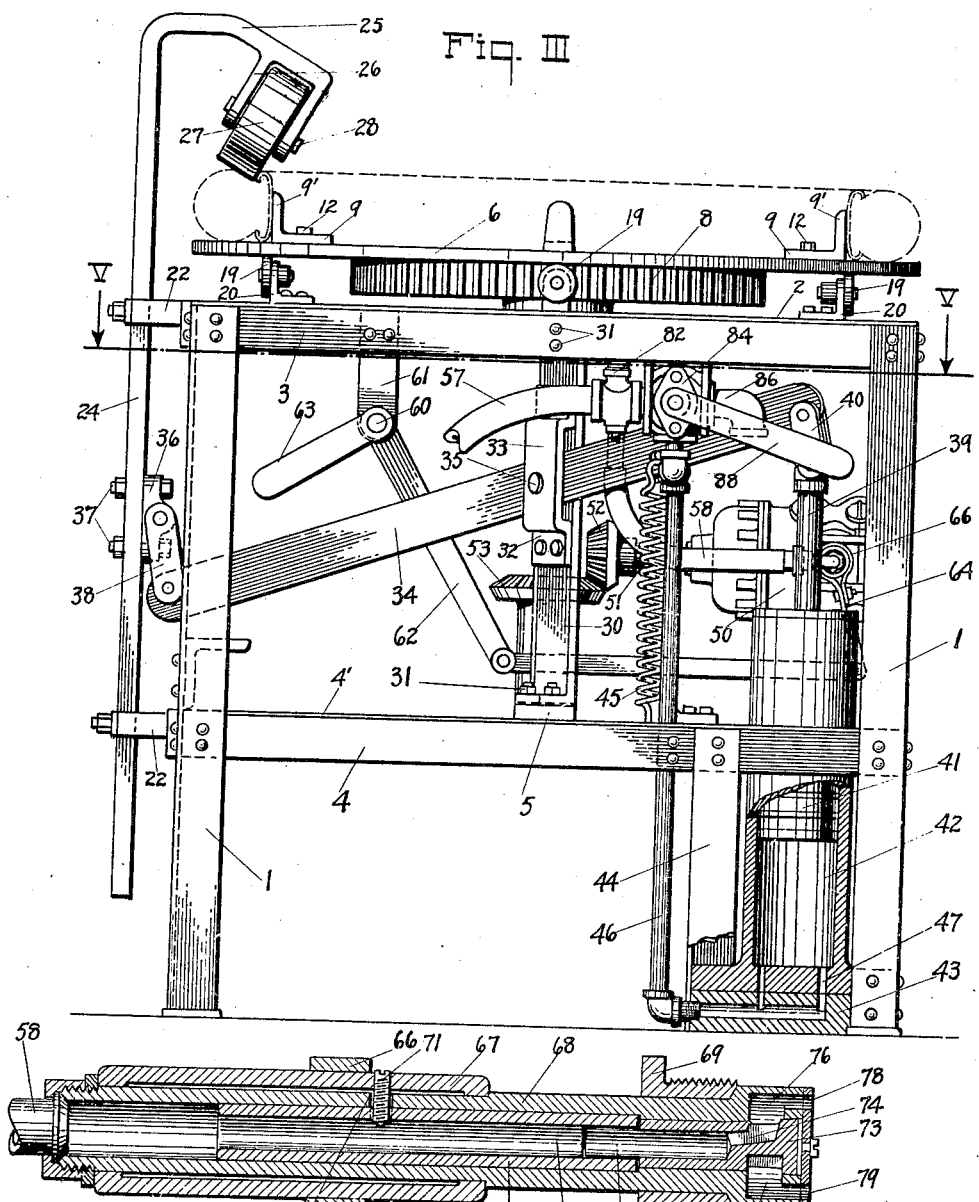

June 17, 1924.                                                         1,498,299
G. W. ROLLINS
MACHINE FOR PLACING TIRES UPON WHEEL RIMS
Filed March 12, 1919         4 Sheets-Sheet 3
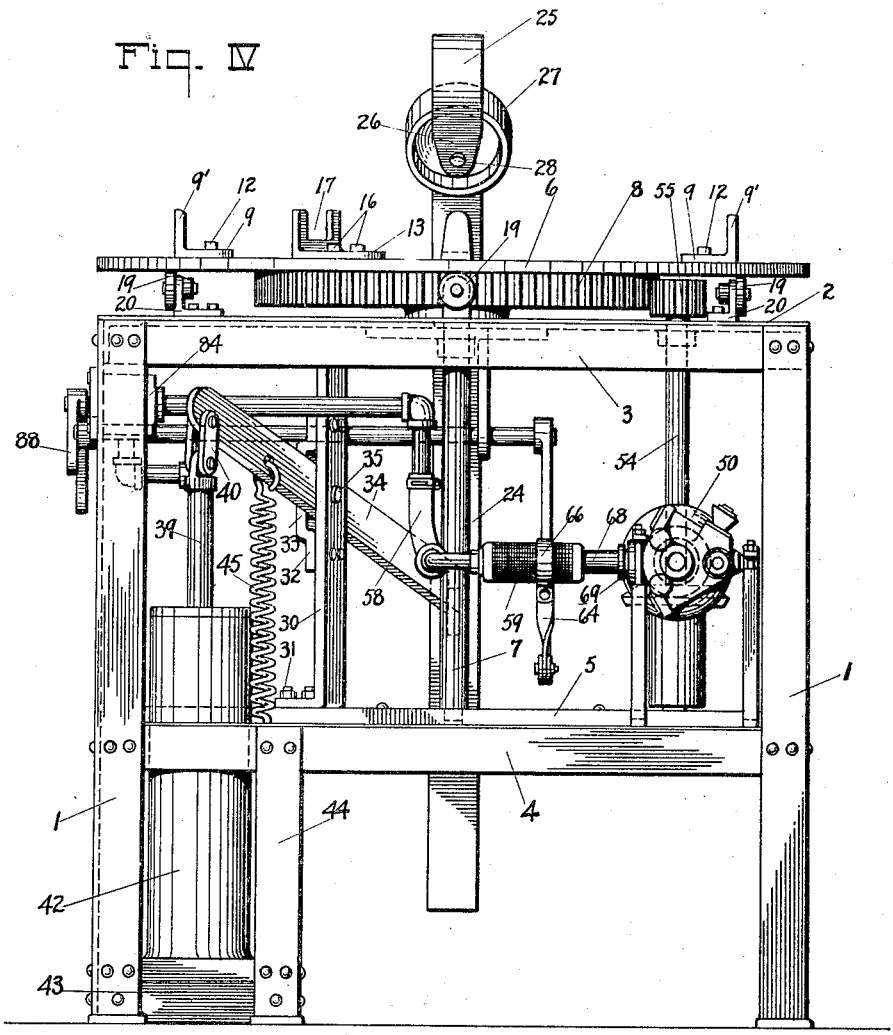
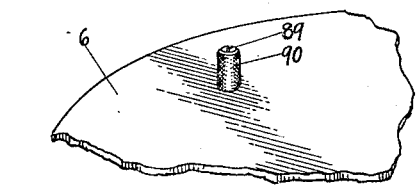
INVENTOR.
Grant W. Rollins.
BY Chester W. Braselton
ATTORNEY.

June 17, 1924.
G. W. ROLLINS
1,498,299
MACHINE FOR PLACING TIRES UPON WHEEL RIMS
Filed March 12, 1919     4 Sheets-Sheet 4
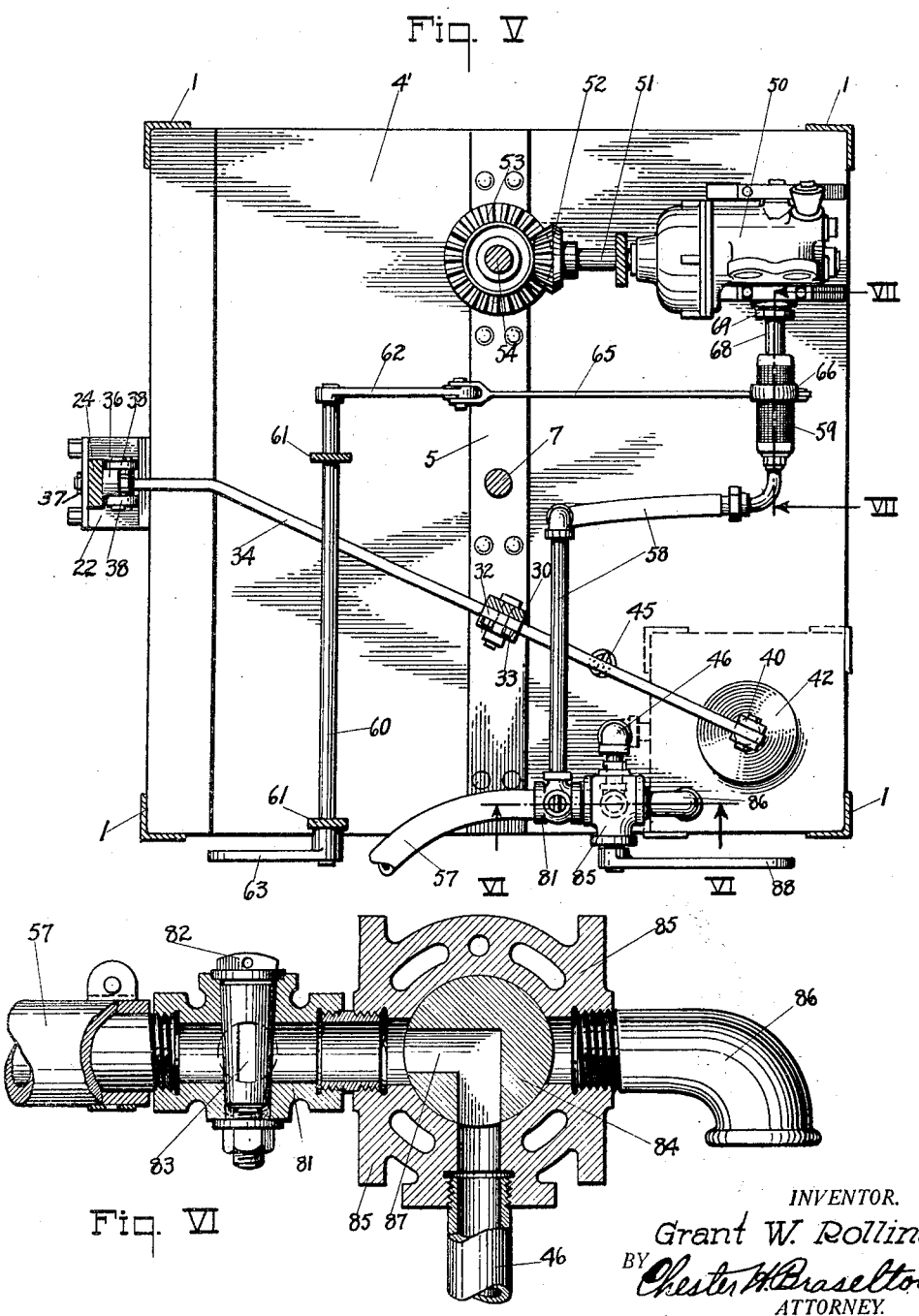
Fig. V
Fig. VI
INVENTOR.
Grant W. Rollins.
BY Chester W. Braselton
ATTORNEY.

Patented June 17, 1924.

1,498,299

UNITED STATES PATENT OFFICE.

GRANT W. ROLLINS, OF TOLEDO, OHIO, ASSIGNOR TO THE WILLYS-OVERLAND COMPANY, OF TOLEDO, OHIO, A CORPORATION OF OHIO.

MACHINE FOR PLACING TIRES UPON WHEEL RIMS.

Application filed March 12, 1919. Serial No. 282,132.

*To all whom it may concern:*

Be it known that I, GRANT W. ROLLINS, residing at Toledo, county of Lucas, and State of Ohio, have invented certain new and useful Improvements in Machines for Placing Tires Upon Wheel Rims, of which I declare the following to be a full, clear, and exact description.

This invention relates to an improved machine for placing tires upon wheel rims, and is particularly adapted for use in placing pneumatic tires upon automobile wheels. This machine may be employed with equal facility for placing pneumatic tires upon wheels of different types, and for placing tires upon various different forms of demountable rims, wherein the pneumatic tire is to be sprung over one of the side flanges of the wheel rim.

One object of the invention is to provide a device of this character which will operate expeditiously for the purpose of applying a pneumatic tire to a wheel rim without causing injury to the tire.

A further object of the invention is to provide an improved device of this character, which is of simple construction and efficient in operation.

A further object of the invention is to provide means for mechanically operating a device of this character in such a manner as to combine efficiency with speed of operation.

A further object of the invention is to provide suitable operating means for a device of this character, wherein the various operating mechanisms can be readily controlled by the operator.

Further object of this invention relates to economies of manufacture and details of construction, as will hereinafter appear from the detailed description to follow.

The objects of the invention are accomplished in one instance by the devices and means described in the following specification, but is evident that the same may be varied widely without departing from the scope of the invention as pointed out in the appended claims.

A structure constituting one embodiment of the invention, which may be the preferred, is illustrated in the accompanying drawing forming a part hereof, in which:

Fig. I is a top-plan view of the machine, with a portion of the table broken away to show the relative position of the operating mechanism therefor, and illustrating the relative position of the rim securing means upon the table.

Fig. II is a perspective view of the upper portion of the machine, illustrating its manner of operation.

Fig. III is a side elevational view of the machine, certain of the parts being broken away for the purpose of better illustrating their construction, and showing the position of the operating parts at the end of the tire applying operation.

Fig. IV is an end elevational view of the machine, illustrating the relative position of the various operating parts.

Fig. V is a horizontal-sectional view, taken along the line V—V of Fig. III, and illustrating the relative position of the various parts of the operating mechanism.

Fig. VI is a detail-sectional view, taken along the line VI—VI of Fig. V, and illustrating the construction of the two-way valve for controlling the supply of compressed air to the cylinder.

Fig. VII is an enlarged detail sectional view, taken along the line VII—VII of Fig. V, and illustrating the mechanism for controlling the operation of the compressed air motor.

Fig. VIII is a detail perspective view of a portion of the table, illustrating a modified form of rim securing means, which is particularly adapted to be employed in connection with wire wheels.

Referring to the drawings, similar reference characters designate corresponding parts throughout the several views, and the sectional views are taken looking in the direction of the small arrows at the ends of the section lines.

By employing a machine of the type shown herewith, the tires can be applied to the wheels or rims with a less expenditure of labor, and much more rapidly than when they are applied manually, moreover there is less danger of the tires becoming injured when being placed upon the rims.

In the embodiment of the invention illustrated herewith, the machine frame comprises a plurality of uprights 1 preferably positioned at the corners of the frame, and adapted to support a top portion 2 upon which is mounted a part of the operating mechanism. A plurality of cross members 3 are suitably secured to the upright standards 1 near the upper ends thereof and are adapted to assist in supporting the top portion 2 of the frame. A plurality of cross members 4 are suitably secured to the upright members 1 at points intermediate the ends of the upright members, said cross members serving to securely brace the upright standards as well as to support a table 4' upon which a portion of the operating mechanism is carried. A beam 5 is positioned substantially centrally of the angular frame, and is adapted to have its opposite ends supported by and firmly secured to a pair of the oppositely positioned beams 4.

Positioned slightly above the top portion 2 of the frame is a rotatable member or table 6, which is of substantially circular form and is firmly secured at its central portion to an upright shaft 7, rotatably mounted in bearings carried by the top portion of the frame and the beam 5. An external gear 8 is firmly secured to the under surface of the rotatable member or table 6 in such a manner as to be concentric with the shaft 7 upon which the rotatable table is mounted. Positioned upon the upper surface of the rotatable member 6 are a plurality of adjustable clamping members 9, in the present instance four in number, which are preferably oppositely positioned with respect to the center of the rotating table and each of which is provided with an upstanding flange 9'. Each of these clamping members is provided with a slot 10 extending longitudinally thereof and which provides a means for adjustably positioning the members upon the table by a bolt 11 carried by the table and passing through the slot, and a nut 12 adapted to be threaded upon the upper end of the bolt in such a manner as to firmly clamp the member in position. The purpose of the clamping members 9 is to properly position the wheel rim upon the rotating table and to retain the same in position thereon, while the pneumatic tire is being applied. By reason of the adjustability of the several clamping members 9, they are capable of being positioned in such a manner as to accommodate wheels of different diameter, and once being fixed in position to accommodate a wheel of a given size may be retained in that position without change until it is desired to employ the machine in connection with wheels of a different size. In addition to the clamping members just described, a locking plate 13 is secured to the upper surface of the rotating table, the said locking plate being provided with a slot 14 providing means for securing radial adjustment of the guide plate, said locking plate being retained in proper position upon the upper surface of the table by means of bolts 15, and clamping nuts 16 in a manner similar to that employed for retaining the clamping members 9 in proper fixed position. The locking plate 13 is provided with a recess 17 adapted to accommodate the valve stem boss 18 formed upon the inner surface of the wheel rim, and thus prevent rotation of the wheel rim relative to the table. The rotatable table 6 is adapted to be supported by a plurality of rollers 19, each of which is rotatably mounted in a bracket 20, carried by the top portion of the frame. The axis of each of these rollers 19 is radially positioned with respect to the shaft 7, thus permitting the table to rotate freely about the shaft 7 as a center.

Positioned upon one side of the frame are a pair of guides 22 provided with registering openings 23, within which is positioned a vertically movable bar 24, provided with an angular portion 25 formed at the upper extremity thereof, said angular portion having a pair of spaced arms 26 extending therefrom between which is rotatably mounted a tire engaging member or wheel 27 upon a shaft 28 carried by said arms. The wheel 27 is adapted to engage with one edge of the tire for the purpose of forcing the edge of the rim, as shown in Figs. II and III, and the manner of operating the tire engaging member to secure engagement with the edge of the tire will now be described.

An upright brace member 30 is positioned upon the beam 5 in such a manner that it may be firmly secured to the beam 5 and to the top portion 2 of the frame in any suitable manner, as by bolts 31. Firmly secured to the brace member 30 at a point intermediate its end is a plate 32 provided with an offset portion 33, which is adapted to form with the brace member 30 a channel for the reception of a lever 34. The lever 34 is fulcrumed upon a rod 35 which is adapted to be supported by the brace member 30 and the plate 32 in such a manner as to extend across the recess formed between the depressed portion 33 of the plate and the brace member. A plate 36 is firmly secured to the vertically movable bar 24 by means of bolts or other suitable fastening means 37, and said plate is pivotally connected to one end of the lever 34 through a link 38. The opposite end of the lever 34 is pivotally connected to a piston rod 39 through a link 40. The piston rod 39 is secured to a piston head 41 slidably mounted within a cylinder 42, which is adapted to be supported by a base 43 positioned in proximity to one of the upright frame members 1, and additionally secured to the frame members 4 by a pair of uprights 44 adapted to be secured to the horizontal frame members 4 by bolts or other suitable fastening means. A coiled tension spring 45 is secured at one end to the lever 34 and at its opposite end to a fixed portion of the frame in such a manner as to exert tension upon the lever 34 for the purpose of normally maintaining the tire engaging member a sufficient distance above the upper surface of the rotating table to permit the wheel rim and tire to be readily placed in position upon the table. A branch supply pipe 46 communicates with the interior of the cylinders 42 through a plurality of openings 47, in such a manner as to supply compressed air into the interior of the cylinder for the purpose of raising the piston head 41 and the piston rod 39 carried thereby. It will thus be seen that the tire engaging member 27 is normally maintained at a suitable distance above the upper surface of the rotating table by means of the pivoted lever 34 and the coiled spring 45 connected thereto. When it is desired to depress the tire engaging member into the position illustrated in Fig. II, for the purpose of forcing a tire upon a wheel rim, compressed air is admitted into the interior of the cylinder 42 through the branch supply pipe 46, thus raising the piston head 41 and the piston 39 carried thereby, and through the lever 34 and its associated parts exerting a downwardly acting force upon the vertical slidable bar 24 in such a manner as to depress the tire engaging member and draw the same downwardly into a position in which it will engage the tire to be acted upon in such a manner as to force the same over the edge of the wheel rim.

The manner of rotating the table 6 and the wheel rim A carried thereby will now be described. Suitably carried by a portion of the supporting frame is a motor 50, which in the present instance is of the compressed air type, provided with a shaft 51 having a beveled gear 52 positioned near one end thereof, and located in such a manner as to mesh with a beveled gear 53 carried by an upright shaft 54, which is adapted to be suitably mounted in bearings carried by the beam 5 and the top portion 2 of the frame so as to retain the same in proper position while it is being rotated. Keyed or otherwise firmly secured to the upper end of the shaft 54 is a pinion 55, positioned in such a manner as to be adapted to mesh with the external gear 8 carried by the rotating table 6. Compressed air is admitted to the air motor through a main air supply pipe 57 and a branch pipe 58 communicating therewith, the supply of air to the motor being capable of control through the instrumentality of a control mechanism 59. A mechanism for operating the control devices for the air motor comprises a shaft 60 rotatably mounted in brackets 61 carried by the supporting frame, said shaft 60 having firmly secured thereto a crank arm 62 and an operating lever 63. The crank arm 62 is connected to the operating arm 64 of the control mechanism through a link 65. The operating arm 64 of the control mechanism is provided with a loop portion 66 at one end which is adapted to encircle the control mechanisms, and is firmly secured to the sleeve portion 67 thereof in such a manner as to rotate the same upon movement of the loop portion 66.

The control mechanism for controlling the direction of movement of the air motor comprises a tubular member 68, upon which the sleeve portion 67 is rotatably mounted, said tubular portion 68 being adapted to be secured in the casing of the air motor in such a manner as to form an air-tight joint therewith by means of a bushing member 69 adapted to be threaded within the casing of the air motor. An interior sleeve 70 is rotatably mounted within the tubular member 68 in such a manner as to fit tightly therein, and is connected with the exterior sleeve 67 in such a manner as to be capable of rotation therewith by means of a screw 71. The tubular member 68 is provided with a circular slot 72, within which the screw 71 is adapted to move so as to permit rotation of the exterior sleeve 67 and the interior sleeve 70 relative to the tubular member. A rotatable valve 73 is positioned within the tubular member 68 and is provided with a passage 74, which is adapted upon rotation of the valve to place the interior passage 75 formed in the interior sleeve 70 and the valve member 73 in communication with either of two chambers 76 and 77 formed in the tubular member, said chambers being adapted to communicate with the interior of the air motor through passages 78 and 79 respectively. The valve member 73 is adapted to be connected with the interior sleeve 70 in such a manner as to rotate therewith by means of certain projections 80 formed upon the adjacent ends of the valve member and rotating sleeve. The central passage 75 formed in the interior sleeve 70 and the valve member 73 is adapted to communicate with the branch supply pipe 58 in such a manner as to provide a passage for communicating air pressure to the air motor from the branch supply pipe 58.

The branch pipe 58 is connected to the main supply pipe 57 through a T-joint 81, which is provided with a control valve 82 having a suitable passage 83 formed therein for controlling the supply of compressed air from the main supply pipe 57 to the branch pipe 58 upon rotation of the valve 82. The supply of compressed air from the main supply pipe 57 to the branch pipe 46 communicating with the cylinder 42 is controlled by a two-way valve 84, positioned within a valve casing 85, which serves as a coupling for connecting the main supply pipe 57 with the branch pipe 46 and an outlet passage 86. The two-way valve 84 is provided with an angular opening 87 which may be employed for placing the branch pipe 46 in communication with the main supply pipe 57 or the outlet passage 86, depending upon the position of the valve. Firmly secured to the stem of the rotating valve is a hand operated lever 88 which may be actuated by the operator for the purpose of properly rotating the valve so as to place the branch pipe 46 in communication with the main supply pipe 57 or the outlet passage 86, as may be desired.

In the modified form of tire retaining means illustrated in Fig. VIII, screws or bolts 89 are secured to the rotating table and project upwardly therefrom, said screws or bolts being provided with fabric or rubber covers 90 for the purpose of preventing scarring of the wheel rim when forced thereagainst. The type of tire holding means illustrated in Fig. VIII are preferably employed for retaining wire spoked wheels upon the rotating table for the purpose of applying pneumatic tires thereto. In the usual construction of wire spoked wheels the spokes are positioned considerably closer together upon the interior circumferential surface of the rim than in the case of the usual wooden spoked wheels, thus rendering it advisable to employ a holding means which is of smaller size and has a shorter bearing surface upon the interior circumferential surface of the rim than in the case of wooden spoked wheels or demountable rims.

In the operation of the above described machine, a wheel or wheel rim is placed upon the rotating table in such a manner that the upwardly extending portions of the several clamping members 9 will closely engage the interior circumferential surface of the rim, and the valve stem boss be positioned within the recess 17 formed in the adjustable locking guide 13 to prevent rotation of the rim relative to the table. It will be understood that the clamping members 9 and the holding member 13 are capable of radial adjustment with respect to the rotating table in such a manner as to accommodate tires of different diameters, and that when properly positioned they may be employed with a considerable number of tires of the same diameter before it becomes necessary to change the adjustment for operating upon tires of different diameter. The rim A being positioned upon the rotating table in such a manner that the valve boss 18 is seated within the recess 17, a pneumatic tire B is laid upon the rim and properly positioned thereon so that the valve stem carried by the tire is positioned in the valve boss 18, formed in the rim. Before the tire is placed upon the rim, the inner tube is preferably partially filled with air so as to prevent portions of the same from becoming engaged with the tire and the rim in such a manner as to cause injury to the inner tube. The pneumatic tire being properly positioned upon the wheel rim in the manner above described, the tire engaging member is then depressed by operating the lever 88 in such a manner as to place the branch pipe 46 in communication with the main compressed air supply pipe 57, thus permitting compressed air to flow into the cylinder 42 through the passages 47 and force the piston head 41 and the piston 39 carried thereby upwardly in such a manner as to raise the end of the lever 34 connected thereto against the tension of the spring 45. In this manner, the lever 34 being pivoted at 35 causes the downward movement of the vertical movable bar 24 and the tire engaging member 27 carried thereby in such a manner as to cause the tire engaging member to engage with the side of the tire at a point near the wheel rim, and press the tire downwardly over the flanged edge of the wheel rim.

While in the embodiment of the invention illustrated herewith the various parts of the operating mechanism are actuated by compressed air it is to be understood that any suitable form of motive power may be employed in the operation of the mechanism, as for example electric power, or if preferred, the mechanism may be operated from shafting which is employed to distribute power to different parts of a factory from a control source.

When the tire engaging member is properly positioned in engagement with the tire as described above, rotative movement is imparted to the table by actuating the lever 63 so as to rotate the valve controlling arm 64 and the exterior and interior sleeves 67 and 70 of the usual motor controlling mechanism in such a manner as to place the interior passage 75 in communication with one of the chambers 76 or 77 for rotating the motor shaft in one of two directions. The rotative movement of the motor shaft is communicated to the table through the gears 52 and 53 and the pinion 55, which is adapted to mesh with the exterior gear 8 secured to the lower surface of the table. The table is ordinarily rotated through a complete revolution in one direction, during which period of rotation the tire engaging member forces the tire over the upper flange of the wheel rim in such a manner as to position the same upon the exterior surface of the rim throughout the entire length of the tire with both beads of the tire in interlocking engagement with the flanges of the rim. If, for any reason, the tire is not properly forced over the external flange of the rim, the direction of rotation of the table may be reversed by manipulation of the lever 63 in such a manner as to oppositely rotate the sleeves 67 and 70 together with the valve 73 actuated thereby, so as to place the interior passage 75 in communication with the opposite of the two chambers 76 and 77, thus reversing the point of entry of compressed air into the operating mechanism of the motor and reversing the direction of rotation of the motor shaft 57. The rotation of the table may thus be reversed a sufficient distance to again properly engage the tire engaging member with the exterior surface of the tire, when the direction of rotation of the table may again be reversed and the tire forced over the wheel rim. Suitable means is provided for supplying compressed air to the several parts of the operating mechanism the valve 82 being positioned in such a manner as to permit air to pass from the main supply pipe 57 to the branch pipe 58, and at the same time permit passage of compressed air to the branch pipe 46 from the main supply pipe 57.

Upon completion of the rotation of the table and the operation of forcing the pneumatic tire over the edge of the wheel rim so that the tire and rim are positioned as illustrated in Fig. III of the drawing, the two-way valve 84 may be rotated by the lever 88 in such a manner as to place the branch pipe 46 in communication with the outlet 86, and at the same time cut off the supply of compressed air to the branch pipe 46 from the main supply pipe 57. When the branch pipe 46 is placed in communication with the outlet 86 through the passage 87, the compressed air within the cylinder 42 will be permitted to escape through the outlet 86, and the plunger 39 and piston head 41 together with the end of the lever 34 to which they are attached will be drawn downwardly through the tension exerted by the spring 45. Thus the vertically movable bar 24 will be raised together with the tire engaging member a sufficient distance above the surface of the table so that the wheel rim and tire carried thereby may be readily removed from the table and another rim and tire positioned thereon in the manner previously described. Before removing the rim and tire from the table, the lever 63 is operated so as to actuate the control mechanism of the air motor in such a manner as to cut off the supply of compressed air from the interior of the air motor, thus stopping rotation of the table.

When the device is used for applying tires to wire spoked wheels, the securing means illustrated in Fig. VIII are preferably employed for retaining the wheel in position upon the rotating table. It will be understood that by reason of the structure described above, an efficient and economical means is provided for quickly and easily applying pneumatic tires to wheel rims in such a manner as to effect a considerable saving of time and labor as well as to apply the tires in such a manner as to prevent injury to the same.

While I have shown and described in considerable detail a specific embodiment of my invention, it is to be understood that this showing and description is illustrative only and for the purpose of rendering my invention more clear, and that I do not regard the invention as limited to the details of construction illustrated or described, nor any of them, except in so far as I have included such limitation within the terms of the following claims, in which it is my intention to claim all novelty inherent in my invention broadly as well as specifically.

What I claim as new and desire to secure by Letters Patent is:

1. In a device of the character described, a supporting frame, a table mounted for rotation thereon and adapted to support a flanged wheel rim and a beaded pneumatic tire, means for preventing relative movement between said rim and said table, a wheel mounted above said table and means for resiliently depressing said wheel to engage the beveled portion of said tire adjacent the upper bead and force said tire into position on said rim.

2. In a device of the character described, a supporting frame, a table rotatably mounted thereon and adapted to support a double flanged wheel rim and a double beaded pneumatic tire, devices on said table for centering and holding said rim against rotation relative thereto, mechanism for rotating said table, a wheel mounted with its axis inclined to the plane of said table, and a pneumatic device for depressing said wheel to cause it to engage the tire at a point adjacent the upper bead thereof and force the tire against the table and over the rim with the two beads in interlocking engagement with the two flanges of the rim.

In testimony whereof, I affix my signature.

GRANT W. ROLLINS.